US010768342B2

(12) United States Patent
Kim et al.

(10) Patent No.: US 10,768,342 B2
(45) Date of Patent: Sep. 8, 2020

(54) ANTIREFLECTION FILM COMPRISING A LOW REFRACTIVE INDEX LAYER AND A HARD COATING LAYER

(71) Applicant: LG CHEM, LTD., Seoul (KR)

(72) Inventors: Boo Kyung Kim, Daejeon (KR); Jin Seok Byun, Daejeon (KR); In Young Song, Daejeon (KR); Yeong Rae Chang, Daejeon (KR); Seok Hoon Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 143 days.

(21) Appl. No.: 16/067,857

(22) PCT Filed: Mar. 3, 2017

(86) PCT No.: PCT/KR2017/002332
§ 371 (c)(1),
(2) Date: Jul. 3, 2018

(87) PCT Pub. No.: WO2017/150938
PCT Pub. Date: Sep. 8, 2017

(65) Prior Publication Data
US 2019/0011602 A1   Jan. 10, 2019

(30) Foreign Application Priority Data

Mar. 4, 2016   (KR) .................. 10-2016-0026376
Mar. 2, 2017   (KR) .................. 10-2017-0027321

(51) Int. Cl.
G02B 1/10 (2015.01)
G02B 1/115 (2015.01)
C09D 5/00 (2006.01)
C08L 33/08 (2006.01)
C09D 7/40 (2018.01)
C09D 7/61 (2018.01)
C09D 133/08 (2006.01)
C08J 7/04 (2020.01)
C08J 3/24 (2006.01)
C08J 5/18 (2006.01)
G02B 1/14 (2015.01)
C08K 7/24 (2006.01)
C08K 3/36 (2006.01)
C08G 77/04 (2006.01)

(52) U.S. Cl.
CPC .............. G02B 1/115 (2013.01); C08J 3/24 (2013.01); C08J 5/18 (2013.01); C08J 7/04 (2013.01); C08J 7/0427 (2020.01); C08L 33/08 (2013.01); C09D 5/006 (2013.01); C09D 7/61 (2018.01); C09D 7/67 (2018.01); C09D 7/70 (2018.01); C09D 133/08 (2013.01); G02B 1/14 (2015.01); C08G 77/045 (2013.01); C08J 2301/12 (2013.01); C08J 2433/08 (2013.01); C08K 3/36 (2013.01); C08K 7/24 (2013.01)

(58) Field of Classification Search
CPC ... G02B 1/00; G02B 1/04; G02B 1/10; G02B 1/105; G02B 1/11; G02B 1/111; G02B 1/113; G02B 1/115; G02B 1/14; G02B 5/20; G02B 5/26; G02B 5/281; G02B 5/283; G02B 5/285; G02B 5/286; G02B 5/287
USPC ....... 359/577, 580, 582, 586, 588, 589, 590, 359/838, 839, 883, 884
See application file for complete search history.

(56) References Cited

U.S. PATENT DOCUMENTS

| | | | |
|---|---|---|---|
| 2010/0249265 | A1 | 9/2010 | Engardio et al. |
| 2013/0078440 | A1 | 3/2013 | Kim et al. |
| 2013/0258482 | A1 | 10/2013 | Takahashi et al. |
| 2014/0050909 | A1 | 2/2014 | Choi et al. |
| 2015/0079348 | A1 | 3/2015 | Mizoshita et al. |
| 2017/0343704 | A1* | 11/2017 | Kim ..................... G02B 1/14 |

FOREIGN PATENT DOCUMENTS

| | | |
|---|---|---|
| CN | 101223198 A | 7/2008 |
| CN | 103153617 A | 6/2013 |
| CN | 107850692 A | 3/2018 |
| EP | 3163336 A1 | 5/2017 |
| EP | 3243884 A1 | 11/2017 |
| EP | 3299851 A1 | 3/2018 |
| JP | 2004-255635 A | 9/2004 |
| JP | 2006-047504 A | 2/2006 |
| JP | 2007-025078 A | 2/2007 |
| JP | 2007-293307 A | 11/2007 |
| JP | 2009-042351 A | 2/2009 |
| JP | 2015-014735 A | 1/2015 |
| JP | 2015-072464 A | 4/2015 |
| KR | 10-1256552 B1 | 4/2013 |
| KR | 10-2013-0118069 A | 10/2013 |
| KR | 10-2014-0140139 A | 12/2014 |
| KR | 10-2016-0002407 A | 1/2016 |

(Continued)

OTHER PUBLICATIONS

Search Report and Written Opinion issued for PCT Application No. PCT/KR2017/002332 dated Jun. 13, 2017, 10 pages.

(Continued)

Primary Examiner — Arnel C Lavarias
(74) Attorney, Agent, or Firm — Rothwell, Figg, Ernst & Manbeck, P.C.

(57) ABSTRACT

An antireflection film including a low reflective index layer and a hard coating layer, the low reflective index layer including: a binder resin including a crosslinked polymer of a photopolymerizable compound and polysilsesquioxane having at least one reactive functional group substituted thereon; and inorganic fine particles dispersed in the binder resin, wherein a ratio of internal haze (Hi) to total haze (Ha) is 97% or less and a variation in color coordinate value (b*) before and after alkaline treatment is 0.7 or less.

17 Claims, No Drawings

(56) References Cited

FOREIGN PATENT DOCUMENTS

| KR | 10-2016-0019367 A | 2/2016 |
| KR | 10-1610871 B1 | 4/2016 |
| WO | 2014-092391 A1 | 6/2014 |

OTHER PUBLICATIONS

European Search Report issued for European Patent Application No. 17760342.0 dated Dec. 7, 2018, 11 pages.

* cited by examiner

ANTIREFLECTION FILM COMPRISING A LOW REFRACTIVE INDEX LAYER AND A HARD COATING LAYER

TECHNICAL FIELD

Cross-Reference to Related Application(S)

This application is a 35 U.S.C. § 371 National Phase Entry Application from PCT/KR2017/002332, filed on Mar. 3, 2017, and designating the United States, which claims the benefit of priority from Korean Patent Application No. 10-2016-0026376 filed on Mar. 4, 2016 and Korean Patent Application No. 10-2017-0027321 filed on Mar. 2, 2017 with the Korean Intellectual Property Office, the full disclosures of which are incorporated herein by reference in their entirety.

The present invention relates to an antireflection film. More specifically, the present invention relates to an antireflection film capable of realizing high alkali resistance and scratch resistance at the same time while having low reflectance and high light transmittance, and further capable of enhancing screen sharpness of a display device.

BACKGROUND ART

In general, a flat panel display device such as a PDP or a LCD is equipped with an antireflection film for minimizing the reflection of light incident from the outside.

As a method for minimizing the reflection of light, there exist a method (anti-glare: AG coating) in which a filler such as an inorganic fine particle is dispersed in a resin and coated onto a substrate film to impart irregularities; a method (anti-reflection: AR coating) of using interference of light by forming a plurality of layers having different refractive indexes on a substrate film; a method for mixing them, etc.

Among them, in the case of the AG coating, the absolute amount of reflected light is equivalent to that of a general hard coating, but a low reflection effect can be obtained by reducing the amount of light entering the eye using light scattering through surface irregularities.

However, since the AG coating has poor screen sharpness due to the surface irregularities, many studies on AR coating have recently been conducted.

As for a film using the AR coating, a multi-layer structure in which a hard coating layer (high refractive index layer), a low reflective coating layer, and the like are laminated on a substrate film has been commercialized.

However, the method of forming a plurality of layers as described above has disadvantages in that as the process for forming each layer is performed separately, the interlayer adhesion force (interfacial adhesion) is weak and the scratch resistance is low.

Accordingly, many studies have been conducted to reduce the absolute reflection amount of light incident from the outside and to improve the scratch resistance of the surface, but the degree of improvement in physical properties resulting therefrom is insufficient.

In addition, a method of adding a component such as an inorganic filler to enhance the scratch resistance of a polymer film applied to an antireflection film is known. According to this method, alkali resistance of the polymer film is greatly lowered, and thus there was a limitation that it is not appropriate to apply to the manufacturing process of a polarizing plate and the like.

DETAILED DESCRIPTION OF THE INVENTION

Technical Problem

It is one object of the present invention to provide an antireflection film capable of realizing high alkali resistance and scratch resistance at the same time while having low reflectance and high light transmittance, and further capable of enhancing screen sharpness of a display device.

Technical Solution

There is provided an antireflection film comprising: a low refractive index layer which includes a binder resin containing a crosslinked polymer of a photopolymerizable compound and a polysilsesquioxane substituted with one or more reactive functional groups and inorganic fine particles dispersed in the binder resin; and a hard coating layer; wherein a ratio of internal haze (Hi) to total haze (Ha) of the antireflection film is 97% or less, and a variation in color coordinate value (b*) of the antireflection film before and after alkali treatment is 0.7 or less.

Hereinafter, the antireflection film according to specific embodiments of the present invention will be described in more detail.

In the present disclosure, the photopolymerizable compound collectively refers to a compound which causes a polymerization reaction when irradiated with light, for example, when irradiated with visible light or ultraviolet light.

Further, the (meth)acryl refers to including both acryl and methacryl.

Moreover, the (co)polymer refers to including both a co-polymer and a homopolymer.

Furthermore, the hollow silica particles refer to silica particles derived from a silicon compound or an organosilicon compound, in which empty voids are present on the surface and/or inside of the silica particles.

According to one embodiment of the present invention, an antireflection film including a low refractive index layer and a hard coating layer may be provided, the low refractive index layer including: a binder resin containing a crosslinked polymer of a photopolymerizable compound and a polysilsesquioxane substituted with one or more reactive functional groups; and inorganic fine particles dispersed in the binder resin, wherein a ratio of internal haze (Hi) to total haze (Ha) is 97% or less, and a variation in color coordinate value (b*) before and after alkali treatment is 0.7 or less.

The present inventors conducted intensive studies on the antireflection film, and found through experiments that an antireflection film satisfying the ratio of internal haze (Hi) to total haze (Ha) and the variation in color coordinate value (b*) before and after alkali treatment while including the low refractive index layer and the hard coating layer can achieve lower reflectance and higher light transmittance, improve alkali resistance and at the same time ensure excellent abrasion resistance or scratch resistance, and further exhibit excellent physical properties while enhancing screen sharpness of a display device.

Specifically, the antireflection film may have a ratio of internal haze (Hi) to total haze (Ha) of 97% or less, 95% or less, 30% to 90%, or 52% to 89%.

The total haze (Ha) is defined as a sum of a surface haze (Hs) and an internal haze (Hi), and the total haze can be obtained by measuring haze of the antireflection film itself. The internal haze can be measured by coating a planarization layer on the surface of the antireflection film which has been alkali-treated. As the total haze and the internal haze value are defined, the surface haze value can be defined.

Generally, the higher the surface haze, the greater the effect of reducing the reflectance due to scattering. The effect of reducing the reflectance due to the low refractive index layer is further increased within the same refractive index range, and a certain degree of surface haze must be secured so that a soft visual feeling can be secured in the display device.

On the contrary, when the ratio of the internal haze (Hi) to the total haze (Ha) in the antireflection film exceeds 97%, the ratio of the surface haze (Hs) in the total haze (Ha) becomes excessively small and it is not easy for the antireflection film to ensure sufficiently low reflectance, and further, the interference pattern of the antireflection film is easily exposed, so that the sharpness and visual feeling of the display device finally applied may be deteriorated.

The total haze (Ha) of the antireflection film is not particularly limited, but it may be, for example, 5% or less, 0.05 to 4%, or 0.100 to 3.2%.

Further, the internal haze of the antireflection film is not particularly limited, but may be, for example, 4% or less, 0.100 to 3%, or 0.300 to 2.800%.

In addition, the antireflection film can realize low reflectance and high light transmittance, and the surface characteristics and the optical characteristics may not change significantly between before and after being exposed to an alkali. Specifically, in the antireflection film, the variation in color coordinate value (b*) before or after a predetermined alkali treatment may be 0.7 or less, 0.05 to 0.7, 0.5 or less, 0.1 to 0.5, or 0.28 to 0.4.

The variation in color coordinate value (b*) of the antireflection film before and after the predetermined alkali treatment can be measured using an optical device before and after the alkali pretreatment in which the antireflection film is immersed for 1 second to 100 seconds in an aqueous alkaline solution (sodium hydroxide or the like) diluted to 5 to 50% with distilled water.

The characteristics of the antireflection film depend on the characteristics and the like of the low refractive index layer including a polysilsesquioxane substituted with one or more reactive functional groups.

Specifically, the polysilsesquioxane substituted with one or more reactive functional groups can improve the mechanical properties, for example, scratch resistance, of the low refractive layer since a reactive functional group is present on the surface, and improve the appearance characteristics such as the average reflectance and the color while enhancing the alkali resistance of the low refractive index layer, unlike the case where fine particles of silica, alumina, zeolite, etc. known in the past are used.

On the other hand, when the polarization ellipticity measured by an ellipsometry method is fitted to a Cauchy model of the following General Formula 1 for the low reflective index layer, it can satisfy the condition that A is 1.20 to 1.65, B is 0 to 0.05, and C is 0 to 0.05, and it can satisfy the condition that A is 1.35 to 1.40, B is 0.00200 to 0.00800, and C is 0 to 0.005.

$$n(\lambda) = A + \frac{B}{\lambda^2} + \frac{C}{\lambda^4}$$ [General Formula 1]

In the above General Formula 1, $n(\lambda)$ is a refractive index at a wavelength $\lambda$, $\lambda$ is in a range of 300 nm to 1800 nm, and A, B, and C are Cauchy parameters.

In addition, when the polarization ellipticity measured by an ellipsometry method is fitted to a Cauchy model of the General Formula 1 for the hard coating layer, it can satisfy the condition that A is 1.30 to 1.75, B is 0 to 0.05, and C is 0 to 0.005, and it may satisfy the condition that A is 1.500 to 1.520, B is 0.00100 to 0.00600, and C is 0.00001 to 0.001.

The polarization ellipticity and related ellipsometry data ($\psi$, $\Delta$) measured by the ellipsometry method can be measured using commonly known methods and apparatuses.

For example, ellipsometry measurements can be performed for the low reflective index layer and the hard coating layer of the antireflection film at an incident angle of 70° in a wavelength range of 380 nm to 1000 nm using a J. A. Woollam Co. M-2000 apparatus.

The measured ellipsometry data ($\psi$, $\Delta$) can be fitted to a Cauchy model of the General Formula 1 using Complete EASE software so that MSE becomes 3 or less.

The Cauchy parameters A, B, and C in the low reflective index layer and the hard coating layer described above are each related to a change in a refractive index and extinction coefficient according to the wavelength. When each of the low refractive index layer and the hard coating layer satisfies the ranges of Cauchy parameters A, B, and C according to the result of fitting to a Cauchy model of General Formula 1, it is possible to maintain an internally fitted electron density and refractive index distribution, thereby realizing lower reflectance and having a relatively stable structure against scratches and external contaminants.

Specifically, the Cauchy parameter A is related to the lowest refractive index per wavelength, and B and C are related to the degree of reduction of the refractive index due to an increase in wavelength.

The low reflective index layer may have a thickness of 1 nm to 200 nm, and the hard coating layer may have a thickness of 0.1 µm to 100 µm, or 1 µm to 10 µm.

The thicknesses of the low refractive index layer and the hard coating layer can be confirmed by fitting the polarization ellipticity measured by an ellipsometry method to a Cauchy model of General Formula 1.

On the other hand, the low reflective index layer may include a binder resin containing a crosslinked polymer of a photopolymerizable compound and a polysilsesquioxane substituted with one or more reactive functional groups, and inorganic fine particles dispersed in the binder resin.

Further, the polysilsesquioxane may be represented by $(RSiO_{1.5})_n$ (where n is 4 to 30, or 8 to 20), and may have various structures such as a random type, a ladder type, a cage type, a partial cage type, etc.

However, in order to enhance the physical properties and quality of the low refractive index layer and the antireflection film produced from the photopolymerizable coating composition of the one embodiment, a polyhedral oligomeric silsesquioxane having a cage structure, in which one or more reactive functional groups are substituted, may be used as the polysilsesquioxane substituted with one or more reactive functional groups.

Further, more preferably, the polyhedral oligomeric silsesquioxane having a cage structure, in which one or more functional groups are substituted, may include 8 to 20 silicon atoms in a molecule.

In addition, at least one silicon atom of the polyhedral oligomeric polysilsesquioxane having a cage structure may be substituted with a reactive functional group, and further, the silicon atoms in which reactive functional groups are not substituted may be substituted with the unreactive functional groups described above.

As at least one silicon atom of the polyhedral oligomeric polysilsesquioxane having a cage structure is substituted with a reactive functional group, the mechanical properties of the coating film or the binder resin formed during photopolymerization of the photopolymerizable coating composition may be enhanced. Further, as the remaining silicon atoms are substituted with unreactive functional groups, steric hindrance structurally appears molecularly, which significantly decreases the frequency or probability of exposure of the siloxane bond (—Si—O—) to the outside, and thus it is possible to enhance the alkali resistance of the coating film or the binder resin formed during the photopolymerization of the photopolymerizable coating composition.

The reactive functional group substituted on the polysilsesquioxane may include at least one functional group selected from the group consisting of an alcohol, an amine, a carboxylic acid, an epoxide, an imide, a (meth)acrylate, a nitrile, a norbornene, an olefin (ally, cycloalkenyl, vinyldimethylsilyl, etc.), polyethylene glycol, a thiol, and a vinyl group, and may preferably be an epoxide or a (meth) acrylate.

More specific examples of the reactive functional group include (meth)acrylates, alkyl(meth)acrylates having 1 to 20 carbon atoms, cycloalkyl epoxides having 3 to 20 carbon atoms, and cycloalkane epoxides having 1 to 10 carbon atoms.

The alkyl(meth)acrylate means that the other part of 'alkyl' that is not bonded to (meth)acrylate is a bonding position, the cycloalkyl epoxide means that the other part of 'cycloalkyl' that is not bonded to an epoxide is a bonding position, and the alkyl cycloalkane epoxide means that the other part of 'alkyl' that is not bonded to a cycloalkane epoxide is a bonding position.

On the other hand, the polysilsesquioxane substituted with one or more reactive functional groups may further include at least one unreactive functional group selected from the group consisting of a linear or branched alkyl group having 1 to 20 carbon atoms, a cyclohexyl group having 6 to 20 carbon atoms, and an aryl group having 6 to 20 carbon atoms, in addition to the above-described reactive functional group.

As such, as the reactive functional groups and the unreactive functional groups are surface-substituted in the polysilsesquioxane, the siloxane bond (—Si—O—) in the polysilsesquioxane substituted with one or more reactive functional groups is located inside the molecule and is not exposed to the outside, thereby further enhancing the alkali resistance and scratch resistance of the low reflective index layer and the antireflection film.

On the other hand, examples of the polyhedral oligomeric silsesquioxane (POSS) having a cage structure in which at least one reactive functional group is substituted include: a POSS in which at least one alcohol is substituted, such as TMP diolisobutyl POSS, cyclohexanediol isobutyl POSS, 1,2-propanediollsobutyl POSS, octa(3-hydroxy-3 methylbutyldimethylsiloxy) POSS, etc.; a POSS in which at least one amine is substituted, such as aminopropylisobutyl POSS, aminopropylisooctyl POSS, aminoethylaminopropyl isobutyl POSS, N-phenylaminopropyl POSS, N-methylaminopropyl isobutyl POSS, octaammonium POSS, aminophenylcyclohexyl POSS, aminophenylisobutyl POSS, etc.; a POSS in which at least one carboxylic acid is substituted, such as maleamic acid-cyclohexyl POSS, maleamic acid-isobutyl POSS, octamaleamic acid POSS, etc; a POSS in which at least one epoxide is substituted, such as epoxycyclohexylisobutyl POSS, epoxycyclohexyl POSS, glycidyl POSS, glycidylethyl POSS, glycidylisobutyl POSS, glycidylisooctyl POSS, etc.; a POSS in which at least one imide is substituted, such as POSS maleimide cyclohexyl, POSS maleimide isobutyl, etc.; a POSS in which at least one (meth)acrylate is substituted, such as acryloisobutyl POSS, (meth)acrylisobutyl POSS, (meth)acrylate cyclohexyl POSS, (meth)acrylate isobutyl POSS, (meth)acrylate ethyl POSS, (meth)acrylethyl POSS, (meth)acrylate isooctyl POSS, (meth)acrylisooctyl POSS, (meth)acrylphenyl POSS, (meth)acryl POSS, acrylo POSS, etc.; a POSS in which at least one nitrile group is substituted, such as cyanopropylisobutyl POSS, etc.; a POSS in which at least one norbornene is substituted, such as norbornenylethylethyl POSS, norbornenylethylisobutyl POSS, norbornenylethyl disilanoisobutyl POSS, trisnorbornenylisobutyl POSS, etc.; a POSS in which at least one vinyl group is substituted, such as allylisobutyl POSS, monovinylisobutyl POSS, octacyclohexenyldimethylsilyl POSS, octavinyldimethylsilyl POSS, octavinyl POSS, etc.; a POSS in which at least one olefin is substituted, such as allylisobutyl POSS, monovinylisobutyl POSS, octacyclohexenyldimethylsilyl POSS, octavinyldimethylsilyl POSS, octavinyl POSS, etc.; a POSS in which a PEG having 5 to 30 carbon atoms is substituted; or a POSS in which at least one thiol group is substituted, such as mercaptopropylisobutyl POSS, mercaptopropylisooctyl POSS, etc.

The weight ratio of the portion derived from the polysilsesquioxane substituted with one or more reactive functional groups to the portion derived from the photopolymerizable compound in the binder resin may be 0.005 to 0.50, 0.005 to 0.25, or 0.015 to 0.19.

When the weight ratio of the portion derived from the polysilsesquioxane substituted with one or more reactive functional groups to the portion derived from the photopolymerizable compound in the binder resin is too small, it may be difficult to sufficiently ensure the alkali resistance and scratch resistance of the refractive index layer.

Further, when the weight ratio of the portion derived from the polysilsesquioxane substituted with one or more reactive functional groups to the portion derived from the photopolymerizable compound in the binder resin is too large, the transparency of the reflective index layer or the antireflection film may be lowered, and the scratch resistance may be rather lowered.

On the other hand, the photopolymerizable compound forming the binder resin may include a monomer or oligomer containing a (meth)acrylate or vinyl group.

Specifically, the photopolymerizable compound may include a monomer or an oligomer containing one or more, two or more, or three or more (meth)acrylate or vinyl groups.

Specific examples of the monomer or oligomer containing a (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, an epoxide acrylate oligomer, an ether acrylate oligomer, a dendritic acrylate oligomer, or a mixture of two or more thereof.

Herein, the molecular weight of the oligomers is preferably 1000 to 10,000.

Specific examples of the monomer or oligomer containing a vinyl group include divinylbenzene, styrene, and paramethyl styrene.

The content of the portion derived from the photopolymerizable compound in the binder resin is not particularly limited. However, considering the mechanical properties of the finally manufactured low refractive index layer and the antireflection film, the content of the photopolymerizable compound may be 20% by weight to 80% by weight.

Further, as described above, the low refractive index layer may include a portion derived from a fluorine-based compound containing a photoreactive functional group.

As the fluorine-based compound containing the photoreactive functional group is included, the low refractive index layer and the antireflection film can have lower reflectance and improved light transmittance, and can further enhance alkali resistance and scratch resistance.

Thus, the binder resin may further include a crosslinked polymer of a photopolymerizable compound, a fluorine-based compound containing a photoreactive functional group, and a polysilsesquioxane substituted with one or more reactive functional groups.

The fluorine-based compound may include or be substituted with at least one photoreactive functional group, and the photoreactive functional group refers to a functional group which can participate in a polymerization reaction by irradiation of light, for example, by irradiation of visible light or ultraviolet light.

The photoreactive functional group may include various functional groups known to be able to participate in a polymerization reaction by irradiation of light. Specific examples thereof may include a (meth)acrylate group, an epoxide group, a vinyl group, and a thiol group.

The fluorine-based compound containing the photoreactive functional group may have a fluorine content of 1 to 60% by weight.

When the content of fluorine in the fluorine-based compound containing the photoreactive functional group is too small, the fluorine component cannot be sufficiently arranged on the surface of the low reflective index, and thus it may be difficult to sufficiently secure the physical properties such as alkali resistance.

In addition, when the content of fluorine in the fluorine-based compound containing the photoreactive functional group is too large, the surface characteristics of the low reflective index layer may be decreased, or the incidence rate of defective products may be increased in a subsequent process for obtaining the final product.

Meanwhile, when the low refractive index layer is formed on one surface of the hard coating layer having the antireflection function, in order to minimize problems due to the peeling electrification voltage that may occur during the manufacturing process or the actual application process of the antireflection film, the low reflective index layer may include a fluorine-based compound containing a photoreactive functional group having a fluorine content of 1% by weight to 25% by weight.

The fluorine-based compound containing the photoreactive functional group may further include silicon or a silicon compound.

That is, the fluorine-based compound containing the photoreactive functional group may optionally contain silicon or a silicon compound therein, and specifically, the content of silicon in the fluorine-based compound containing the photoreactive functional group may be 0.1% by weight to 20% by weight.

The silicon contained in the fluorine-based compound containing the photoreactive functional group may serve to increase transparency by preventing the generation of haze in the low refractive index layer.

On the other hand, if the content of silicon in the fluorine-based compound containing the photoreactive functional group becomes too large, the alkali resistance of the low refractive index layer may be reduced.

The fluorine-based compound containing the photoreactive functional group may have a weight average molecular weight (weight average molecular weight in terms of polystyrene measured by GPO method) of 2000 to 200,000.

If the weight average molecular weight of the fluorine-based compound containing the photoreactive functional group is too small, the low refractive index layer may not have sufficient alkali resistance characteristics.

Further, when the weight average molecular weight of the fluorine-based compound containing the photoreactive functional group is too large, the low refractive index layer may not have sufficient durability and scratch resistance, compatibility between the other components and the fluorine-based compound containing the photoreactive functional group may be lowered, and uniform dispersion does not occur during the production of the low refractive index layer, so that the internal structure and surface characteristics of the final product can be lowered.

Specifically, the fluorine-based compound containing the photoreactive functional group may include: i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer (for example, a polydimethylsiloxane-based polymer) in which at least one photoreactive functional group is substituted and at least one fluorine is substituted on at least one silicon; iv) a polyether compound in which at least one photoreactive functional group is substituted and at least one hydrogen is substituted with fluorine; or a mixture of two or more of i) to iv), or a copolymer thereof.

The low reflective index layer may contain 1 to 75 parts by weight of the fluorine-based compound containing the photoreactive functional group based on 100 parts by weight of the photopolymerizable compound.

When the fluorine-based compound containing the photoreactive functional group is added in an excess amount relative to the photopolymerizable compound, the low refractive index layer may not have sufficient durability or scratch resistance.

In addition, when the amount of the fluorine-based compound containing the photoreactive functional group relative to the photopolymerizable compound is too small, the low refractive index layer may not have sufficient alkali resistance.

On the other hand, the binder resin may further include a portion derived from a fluorine-based (meth)acrylate-based compound in addition to the above-mentioned photopolymerizable compound.

The fluorine-based (meth)acrylate-based compound may also be in a state of being crosslinked with any one or more of other components contained in the binder resin.

When the fluorine-based (meth)acrylate-based compound is further included, the weight ratio of the fluorine-based (meth)acrylate-based compound to the monomer or oligomer containing a (meth)acrylate or vinyl group may be 0.1% to 10%.

Specific examples of the fluorine-based (meth)acrylate-based compound include at least one compound selected from the group consisting of the following Chemical Formulae 11 to 15.

[Chemical Formula 11]

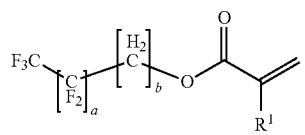

In the above Chemical Formula 11, $R^1$ is a hydrogen group or an alkyl group having 1 to 6 carbon atoms, a is an integer of 0 to 7, and b is an integer of 1 to 3.

[Chemical Formula 12]

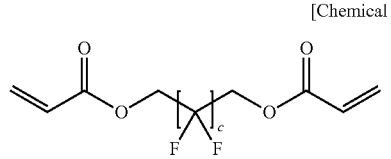

In the above Chemical Formula 12, c is an integer of 1 to 10.

[Chemical Formula 13]

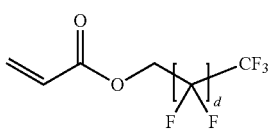

In the above Chemical Formula 13, d is an integer of 1 to 11.

[Chemical Formula 14]

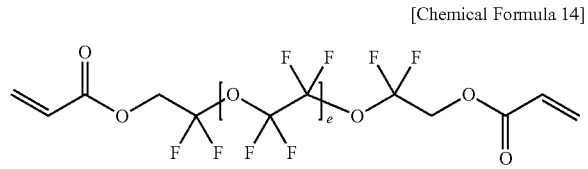

In the above Chemical Formula 14, e is an integer of 1 to 5.

[Chemical Formula 15]

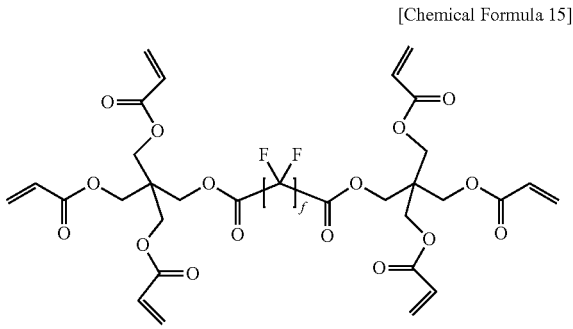

In the above Chemical Formula 15, f is an integer of 4 to 10.

Herein, the inorganic fine particle means an inorganic particle having a diameter of nanometer or micrometer units.

Specifically, the inorganic fine particles may include solid inorganic nanoparticles and/or hollow inorganic nanoparticles.

The solid inorganic nanoparticles means particles having a maximum diameter of 100 nm or less, and having a form in which empty voids are not present therein.

Further, the hollow inorganic nanoparticles means particles having an average diameter of 200 nm or less and having a form in which empty voids are present on the surface and/or inside thereof.

The solid inorganic nanoparticles may have a diameter of 0.5 to 100 nm, or 1 to 50 nm.

The hollow inorganic nanoparticles may have a diameter of 1 to 200 nm, or 10 to 100 nm.

Meanwhile, each of the solid inorganic nanoparticles and the hollow inorganic nanoparticles may have at least one reactive functional group selected from the group consisting of a (meth)acrylate group, an epoxide group, a vinyl group, and a thiol group on the surface thereof.

As each of the solid inorganic nanoparticles and the hollow inorganic nanoparticles contains the above-described reactive functional group on the surface, the low refractive index layer can have a higher degree of crosslinking, thereby securing more improved scratch resistance and antifouling property.

In addition, as for the hollow inorganic nanoparticles, hollow inorganic nanoparticles whose surface is coated with a fluorine-based compound may be used either alone or in combination with hollow inorganic nanoparticles whose surface is not coated with a fluorine-based compound.

When the surface of the hollow inorganic nanoparticles is coated with a fluorine-based compound, the surface energy may be further reduced and thereby the durability and scratch resistance of the low reflective index layer may be further increased.

As a method of coating a fluorine-based compound onto the surface of the hollow inorganic nanoparticles, conventionally known particle coating methods, polymerization methods, and the like may be used without particular limitation. For example, the hollow inorganic nanoparticles and the fluorine-based compound may be subjected to a sol-gel reaction in the presence of water and a catalyst, and thereby the fluorine-based compound may be bonded to the surface of the hollow inorganic nanoparticles via a hydrolysis and condensation reaction.

Specific examples of the hollow inorganic nanoparticles may include hollow silica particles.

The hollow silica may include a predetermined functional group substituted on the surface thereof to be more readily dispersed in the organic solvent.

Examples of organic functional groups which can be substituted on the surface of the hollow silica particles are not particularly limited, but for example, a (meth)acrylate group, a vinyl group, a hydroxyl group, an amine group, an allyl group, an epoxy group, a hydroxyl group, an isocyanate group, an amine group, fluorine, etc. may be substituted on the surface of the hollow silica.

The binder resin of the low refractive index layer may include 10 to 350 parts by weight, or 50 to 280 parts by weight, of the inorganic fine particles based on 100 parts by weight of the photopolymerizable compound. When the hollow particles are added in an excess amount, the scratch resistance and abrasion resistance of the coating film may be deteriorated due to a decrease in the content of the binder.

Meanwhile, the low refractive index layer can be produced by coating a photopolymerizable coating composition including a photopolymerizable compound, inorganic fine particles, and a polysilsesquioxane substituted with one or more reactive functional groups onto a predetermined substrate, and then photopolymerizing the coated product.

The specific type and thickness of the substrate are not particularly limited, and a substrate known to be used in the production of the low refractive index layer or the antireflection film can be used without particular limitation.

The photopolymerizable coating composition may further include a fluorine-based compound containing a photoreactive functional group.

The photopolymerizable coating composition may further include a photoinitiator.

As the photopolymerization initiator, any compound known to be usable in a photopolymerizable resin composition may be used without particular limitation. Specifically, a benzophenone-based compound, an acetophenone-based based compound, a nonimidazole-based compound, a triazine-based compound, an oxime-based compound, or a mixture of two or more thereof may be used.

The photopolymerization initiator may be used in an amount of 1 to 100 parts by weight based on 100 parts by weight of the photopolymerizable compound.

If the amount of the photopolymerization initiator is too small, the photopolymerization initiator may not be cured in the photopolymerization step of the photopolymerizable coating composition to generate a residual material.

If the amount of the photopolymerization initiator is too large, the unreacted initiator may remain as impurities or the crosslinking density may be lowered, and thus the mechanical properties of the resulting film may be deteriorated, or the reflectance may be greatly increased.

In addition, the photopolymerizable coating composition may further include an inorganic solvent.

Non-limiting examples of the organic solvent include ketones, alcohols, acetates, and ethers, or a mixture of two or more thereof.

Specific examples of such organic solvent include ketones such as methyl ethyl ketone, methyl isobutyl ketone, acetylacetone, and isobutyl ketone; alcohols such as methanol, ethanol, n-propanol, i-propanol, n-butanol, i-butanol, and t-butanol; acetates such as ethyl acetate, i-propyl acetate, and polyethylene glycol monomethyl ether acetate; ethers such as tetrahydrofuran and propylene glycol monomethyl ether; or a mixture of two or more thereof.

The organic solvent may be added at the time of mixing the respective components contained in the photopolymerizable coating composition, or may be added to the photopolymerizable coating composition while the respective components are added in a state of being dispersed or mixed in the organic solvent.

If the content of the organic solvent in the photopolymerizable coating composition is too small, the flowability of the photopolymerizable coating composition may be reduced, resulting in defects such as generation of stripes in the finally produced film, or the like.

Further, if the organic solvent is added in an excess amount, the solid content is lowered, the physical properties and surface properties of the film may be deteriorated due to insufficient coating and film formation, and defects may occur during the drying and curing processes.

Accordingly, the photopolymerizable coating composition may include an organic solvent such that the concentration of the total solids of the components contained becomes 1% by weight to 50% by weight, or 2% by weight to 20% by weight.

The method and apparatus commonly used for coating the photopolymerizable coating composition can be used without particular limitation. For example, a bar coating method, such as Meyer bar method or the like, a gravure coating method, a 2-roll reverse coating method, a vacuum slot die coating method, a 2-roll coating method, or the like can be used.

In the step of photopolymerizing the photopolymerizable coating composition, ultraviolet light or visible light having a wavelength of 200 nm to 400 nm can be irradiated, and the amount of exposure is preferably 100 to 4000 $mJ/cm^2$.

The exposure time is not particularly limited, and can be appropriately varied depending on the exposure apparatus used, the wavelength of the irradiated light, or the amount of exposure.

Further, in the step of photopolymerizing the photopolymerizable coating composition, nitrogen purging or the like may be performed in order to apply a nitrogen atmosphere condition.

The antireflection film may have average reflectance of 2.2% or less, 1.5% or less, or 1.20% or less.

On the other hand, as the hard coating layer, one conventionally known in the art can be used without any particular limitation.

As one example of the hard coating film, a hard coating film including a binder resin containing a photopolymerizable resin and a high molecular weight (co)polymer having a weight average molecular weight of 10,000 or more, and an organic or inorganic fine particle dispersed in the binder resin, may be mentioned.

The high molecular weight (co)polymer may be at least one selected from the group consisting of a cellulose-based polymer, an acrylic-based polymer, a styrene-based polymer, an epoxide-based polymer, a nylon-based polymer, a urethane-based polymer, and a polyolefin-based polymer.

The photopolymerizable resin contained in the hard coating layer is a polymer of a photopolymerizable compound which can cause a polymerization reaction when irradiated with light such as ultraviolet rays, and may be one conventionally used in the art.

Specifically, the photopolymerizable resin may include: at least one selected from the group consisting of a reactive acrylate oligomer group including a urethane acrylate oligomer, an epoxide acrylate oligomer, a polyester acrylate, and a polyether acrylate; and a polyfunctional acrylate monomer group including dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycerol triacrylate, tripropylene glycol diacrylate, and ethylene glycol diacrylate.

The particle size of the organic or inorganic fine particles is not specifically limited, but for example, the organic fine particles may have a particle diameter of 1 to 10 µm, and the inorganic particles may have a particle diameter of 1 µm to 500 µm, or 1 µm to 300 µm.

In addition, specific examples of the organic or inorganic fine particles contained in the hard coating film are not particularly limited, but for example, the organic or inorganic fine particles may be organic fine particles composed of an acrylic-based resin, a styrene-based resin, an epoxide resin, and a nylon resin, or inorganic fine particles composed of silicon oxide, titanium dioxide, indium oxide, tin oxide, zirconium oxide, and zinc oxide.

The hard coating film may be formed from an anti-glare coating composition including organic or inorganic fine particles, a photopolymerizable resin, a photoinitiator, and a high molecular weight (co)polymer having a weight average molecular weight of 10,000 or more.

As another example of the hard coating film, a hard coating film including a binder resin of a photopolymerizable resin and an antistatic agent dispersed in the binder resin may be mentioned.

The photopolymerizable resin contained in the hard coating layer is a polymer of a photopolymerizable compound which can cause a polymerization reaction when irradiated with light such as ultraviolet rays, and may be one conventionally used in the art.

Preferably, however, the photopolymerizable compound may be a polyfunctional (meth)acrylate-based monomer or oligomer, wherein the number of (meth)acrylate functional groups is 2 to 10, preferably 2 to 8, and more preferably 2 to 7, which is advantageous in terms of securing the physical properties of the hard coating layer.

More preferably, the photopolymerizable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, and trimethylolpropane polyethoxy tri(meth)acrylate.

The antistatic agent may be a quaternary ammonium salt compound, a conductive polymer, or a mixture thereof.

Here, the quaternary ammonium salt compound may be a compound having at least one quaternary ammonium salt group in the molecule, and a low molecular weight form or a high molecular weight form may be used without limitation.

Further, as for the conductive polymer, a low molecular weight form or a high molecular weight form can be used without limitation, and its type is not particularly limited as long as it may be one that is conventionally used in the technical field to which the present invention pertains.

The hard coating film including a photopolymerizable resin binder resin and an antistatic agent dispersed in the binder resin, and may further include at least one compound selected from the group consisting of an alkoxysilane-based oligomer and a metal alkoxide-based oligomer.

The alkoxysilane-based compound may be one that is conventionally used in the art, but preferably includes at least one compound selected from the group consisting of tetramethoxysilane, tetraethoxysilane, tetraisopropoxysilane, methyltrimethoxysilane, methyltriethoxysilane, meth-acryloxypropyl trimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water.

The sol-gel reaction can be carried out by a method similar to the method for producing an alkoxysilane-based oligomer described above.

However, since the metal alkoxide-based compound can react rapidly with water, the sol-gel reaction is carried out by diluting the metal alkoxide-based compound in an organic solvent and then slowly dripping water thereto.

In this case, it is preferable that the molar ratio (based on metal ions) of the metal alkoxide compound to water is adjusted within the range of 3 to 170, in consideration of reaction efficiency and the like.

Here, the metal alkoxide-based compound may be at least one compound selected from the group consisting of titanium tetra-isopropoxide, zirconium isopropoxide, and aluminum isopropoxide.

On the other hand, the antireflection film may further include a substrate bonded to the other surface of the hard coating layer.

The substrate may be a transparent film having light transmittance of 90% or more and haze of 1% or less.

The material of the substrate may be triacetyl cellulose, a cycloolefin polymer, a polyacrylate, a polycarbonate, polyethylene terephthalate, or the like.

In addition, the thickness of the substrate film may be 10 to 300 µm in consideration of productivity and the like. However, the present invention is not limited thereto Advantageous Effects According to the present invention, an antireflection film capable of realizing high alkali resistance and scratch resistance at the same time while having low reflectance and high light transmittance, and further capable of enhancing screen sharpness of a display device, can be provided.

In the case of the antireflection film, because appearance characteristics such as reflectance or light transmittance or mechanical properties such as abrasion resistance and scratch resistance are not greatly reduced even when exposed to an alkali, the process of applying an additional protection film for protecting the outer surface can be omitted, and thus the production process can be simplified and production costs can be reduced.

DETAILED DESCRIPTION OF THE EMBODIMENTS

The present invention will be described in more detail by way of examples. However, the following examples are for illustrative purposes only and are not intended to limit the scope of the present invention thereto.

PREPARATION EXAMPLE

Preparation Example 1: Preparation of Hard Coating Film 1 (HD1)

30 g of pentaerythritol triacrylate, 2.5 g of a high molecular weight copolymer (BEAMSET 371, Arakawa Chemical Industries, Ltd., Epoxy Acrylate, molecular weight 40,000), 20 g of methyl ethyl ketone, and 0.5 g of a leveling agent (Togo wet 270) were homogeneously mixed, and then 2 g of acrylic-styrene copolymer resin fine particles with a refractive index of 1.525 (volume average particle size: 2 μm, manufacturer: Sekisui Plastic) were added thereto to prepare a hard coating composition.

The hard coating composition thus obtained was coated onto a triacetyl cellulose film with a #10 Meyer bar, and dried at 90° C. for 1 minute. Ultraviolet rays of 150 mJ/cm² were irradiated onto the dried product to prepare a hard coating film having a thickness of 4 μm.

Preparation Example 2: Preparation of Hard Coating Film 2 (HD2)

30 g of pentaerythritol triacrylate, 2.5 g of a high molecular weight copolymer (BEAMSET 371, Arakawa Chemical Industries, Ltd., Epoxy Acrylate, molecular weight 40,000), 20 g of methyl ethyl ketone, and 0.5 g of a leveling agent (Tego wet 270) were homogeneously mixed, and then 2 g of acrylic-styrene copolymer resin fine particles with a refractive index of 1.515 (volume average particle size: 2 μm, manufacturer: Sekisui Plastic) were added thereto to prepare a hard coating composition.

The hard coating composition thus obtained was coated onto a triacetyl cellulose film with a #10 Meyer bar, and dried at 90° C. for 1 minute. Ultraviolet rays of 150 mJ/cm² were irradiated onto the dried product to prepare a hard coating film having a thickness of 4 μm.

Preparation Example 3: Preparation of Hard Coating Film 3 (HD3)

30 g of pentaerythritol triacrylate, 2.5 g of a high molecular weight copolymer (BEAMSET 371, Arakawa Chemical Industries, Ltd., Epoxy Acrylate, molecular weight 40,000), 20 g of methyl ethyl ketone, and 0.5 g of a leveling agent (Tego wet 270) were homogeneously mixed, and then 2 g of acrylic-styrene copolymer resin fine particles with a refractive index of 1.544 (volume average particle size: 2 μm, manufacturer: Sekisui Plastic) were added thereto to prepare a hard coating composition.

The hard coating composition thus obtained was coated onto a triacetyl cellulose film with a #10 Meyer bar, and dried at 90° C. for 1 minute. Ultraviolet light of 150 mJ/cm² was irradiated onto the dried product to prepare a hard coating film having a thickness of 4 μm.

Preparation Example 4: Preparation of Hard Coating Film 4 (HD4)

A salt type of antistatic hard coating solution (manufactured by KYOEISHA Chemical, solid content: 50 wt %, product name: LJD-1000) was coated onto a triacetyl cellulose film with a #10 Meyer bar, dried at 90° C. for 1 minute, and then irradiated with ultraviolet light of 150 mJ/cm² to prepare a hard coating film (HD4) having a thickness of 4 μm.

EXAMPLES AND COMPARATIVE EXAMPLES: PREPARATION OF ANTIREFLECTION FILM (1) Preparation of a Photopolymerizable Coating Composition for Preparing a Low Reflective Index Layer The components shown in Table 1 below were mixed, and diluted in a solvent mixed with MIBK (methyl isobutyl ketone) and diacetone alcohol (DAA) at a weight ratio of 1:1 so that the solid content became 3% by weight.

TABLE 1

| (unit: g) | LR1 | LR2 | LR3 | LR4 | LR5 |
|---|---|---|---|---|---|
| Hollow silica dispersion | 220 (THRULYA 4320) | 130 (THRULYA 4320) | 220 (THRULYA 4320) | 130 (THRULYA 4320) | 0 |
| ano-silica dispersion liquid | 0 | 0 | 0 | 0 | 16.7 (MIBK-SD) |
| rimethylolpropane triacrylate | 41 | 62 | 47 | 67 | |
| 1H,1H,6H,6H-perfluoro-1,6-hexanediol diacrylate | 0 | 0 | 0 | 0 | 1 |
| olysilsesquioxane | 6 (MA0701) | 5 (MA0701) | 0 | 0 | 4 (AC-SQ-F) |
| luorine-based compound containing photoreactive functional group RS907 | 13.33 | 6.667 | 13.333 | 6.667 | 0.1001 |
| Photoinitiator (Irgacure-127, Ciba) | 5 | 5 | 5 | 5 | 0.25 |

1) THRULYA 4320 (manufactured by Catalysts and Chemicals Ltd.): Hollow silica dispersion liquid (solid content of 20 wt % in MIBK solvent), 2) RS907 (manufactured by DIC): Fluorine-based compound containing a photoreactive functional group and containing a trace amount of silicon, diluted to a solid content of 30% by weight in MIBK solvent.

3) MA0701: manufactured by Hybrid Plastics.

4) AC-SQ-F: manufactured by Toagosei Co., Ltd. (silsesquioxane resin, functional group concentration 678 g/mol, inorganic fraction 15%, refractive index 1.39)

(2) Preparation of a Low Reflective Index Layer and an Antireflection Film (Examples and Comparative Examples)

The photopolymerizable coating compositions each obtained from Table 1 were coated onto the hard coating film described in Table 2 below with a #3 Meyer bar and dried at 60° C. for 1 minute.

Ultraviolet rays of 180 mJ/cm² were irradiated onto the dried product under a nitrogen purge to form a low refractive index layer having a thickness of 110 nm, thereby producing an antireflection film.

Experimental Example: Measurement of Physical Properties of Antireflection Film

For the antireflection films obtained in the examples and comparative examples, experiments of the following items were carried out.

1. Alkaline Pretreatment

The antireflection films obtained in the examples and comparative examples were respectively immersed in an aqueous NaOH solution diluted to 10% with distilled water at 55° C. for 30 seconds, and washed by pouring water, followed by wiping off moisture.

2. Measurement of Average Reflectance and Color Coordinate Value (b*)

For the antireflection films obtained in the examples and comparative examples, the back side of the film was subjected to a darkening process before and after the pretreatment, and then the average reflectance and the color coordinate value (b*) in a wavelength region from 380 nm to 780 nm were measured by applying 100 T mode of Solidspec 3700 (SHIMADZU) equipment.

In the case of the color coordinate value (b*), the obtained average reflectance data was converted by a UV-2401 PC program.

3. Measurement of Scratch Resistance

Before and after the pretreatment, the surfaces of the antireflection films obtained in the examples and comparative examples were rubbed while applying a load to a steel wool (#0000) and reciprocating ten times at a speed of 24 rpm.

The scratch resistance was evaluated by confirming the maximum load at which a scratch of 1 cm or less observed with the naked eye was 1 or less.

4. Haze Measurement

For the antireflection films each obtained in the above examples and comparative examples, the haze was measured at three places using HAZEMETER HM-150 equipment (manufactured by Murakami Color Research Laboratory) according to JIS K7105, and the average value was determined.

(1) Total haze (Ha)=Surface haze (Hs)+Internal haze (Hi)

(2) The total haze is measured with respect to the haze of the antireflection film itself.

(3) The internal haze was obtained by measuring the haze of the entire film after coating the surface of an alkali-treated antireflection film with an 8 μm planarization layer, (4) Alkali treatment: The antireflection films obtained in the examples and comparative examples were respectively immersed in an aqueous NaOH solution diluted to 10% with distilled water at 30° C. for 2 minutes, and washed by pouring water, followed by wiping off moisture. Then, it was dried in an oven at 50° C. for 1 minute.

(5) Planarization layer coating: Pentaerythritol triacrylate and Ebecryl 220 (oligomers of SK Cytec) were mixed in a weight ratio of 6:1, diluted in a 2:1 (weight ratio) mixed solvent of methyl ethyl ketone and toluene so that the solid content became 60 wt %, coated to a dry film thickness of 8 μm using a wire bar, dried, and cured, and then irregularities of the surface were planarized.

5. Ellipsometry Measurement

For the antireflection films each obtained in the examples and comparative examples, the polarization ellipticity was measured by an ellipsometry method.

Specifically, the ellipsometry was measured for the antireflection films each obtained in the examples and comparative examples at an incidence angle of 70° in a wavelength range of 380 nm to 1000 nm using a J. A. Woollam Co. M-2000 apparatus.

The measured ellipsometry data (ψ, Δ) was fitted to a Cauchy model of the following General Formula 1 using Complete EASE software so that MSE became 3 or less.

$$n(\lambda) = A + \frac{B}{\lambda^2} + \frac{C}{\lambda^4}$$ [General Formula 1]

In the above General Formula 1, n(λ) is a refractive index at a wavelength λ, λ is in a range of 300 nm to 1800 nm, and A, B, and C are Cauchy parameters.

TABLE 2

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Low reflective index layer | | LR1 | LR1 | LR1 | LR2 | LR1 | LR3 | LR4 | LR5 |
| Hard coating layer | | HD1 | HD2 | HD3 | HD2 | HD4 | HD3 | HD4 | HD1 |
| Average reflectance (%) | | 1.20 | 1.15 | 1.18 | 2.1 | 1.20 | 1.16 | 2.10 | 1.1 |
| Scratch resistance (g) | | 350 | 350 | 350 | 600 | 350 | 150 | 500 | 300 |
| Total haze (Ha, %) | | 1.723 | 0.452 | 3.124 | 0.780 | 0.190 | 3.226 | 0.341 | 1.725 |
| Internal haze (Hi, %) | | 0.913 | 0.390 | 2.761 | 0.667 | 0.186 | 2.732 | 0.337 | 0.951 |
| Hi/Ha (%) | | 52.99 | 86.28 | 88.38 | 85.51 | 97.89 | 84.69 | 98.83 | 55.13 |
| Variation in color coordinate values (b*) before and after pretreatment | | 0.4 | 0.38 | 0.28 | 0.3 | 0.35 | 0.9 | 1.08 | 1.3 |
| Results of ellipsometry measurements | | | | | | | | | |
| Low reflective index layer | A | 1.37 | 1.36 | 1.38 | 1.4 | 1.38 | 1.36 | 1.41 | 1.36 |
| | B | 0.00426 | 0.00253 | 0.00282 | 0.00789 | 0.0059 | 0.00334 | 0.0069 | 0.00326 |
| | C | 0 | 0.000198 | 6.93*10⁻⁵ | 2.5*10⁻³ | 0.0011 | 5.2*10⁻⁴ | 0 | 0 |
| Hard coating composition | A | 1.514 | 1.513 | 1.513 | 1.509 | 1.511 | 1.513 | 1.519 | 1.512 |
| | B | 0.00518 | 0.00354 | 0.00132 | 0.00343 | 0.00491 | 0.00506 | 0.00114 | 0.00423 |
| | C | 1.6*10⁻⁵ | 4.04*10⁻⁵ | 0.000241 | 0.000254 | 1.13*10⁻⁵ | 3.87*10⁻⁶ | 0.000485 | 1.28*10⁻⁵ |

As shown in Table 2 above, it was confirmed that the antireflection film of the examples exhibited relatively low average reflectance, and the variation in color coordinate after alkali treatment was not so large, and furthermore, it had excellent scratch resistance as compared with the comparative examples.

Specifically, it was confirmed that the antireflection films of the examples had a ratio of internal haze (Hi) to total haze (Ha) of 97% or less, and a variation in color coordinate value (b*) before and after alkali treatment in the range of 0.28 to 0.40.

Further, when the polarization ellipticity measured by an ellipsometry method was fitted to a Cauchy model of the General formula 1 for the antireflection films of the Examples, the low reflective index layer satisfied the condition that A was 1.20 to 1.65, B was 0 to 0.05, and C was 0 to 0.05, and the hard coating layer satisfied the condition that A was 1.30 to 1.75, B was 0 to 0.05, and C was 0 to 0.005.

On the contrary, it was confirmed that the antireflection films of Comparative Examples 1 to 3 exhibited relatively high color coordinate values or low scratch resistance after alkali treatment.

In addition, it was confirmed that the antireflection films of the comparative examples had a ratio of internal haze (Hi) to total haze (Ha) exceeding 97%, or exhibited a relatively large variation in the color coordinate value after the alkali treatment, thus exhibiting relatively low light transmittance and poor alkali resistance and optical properties.

The invention claimed is:

1. An antireflection film comprising: a low refractive index layer and a hard coating layer, wherein the low refractive index layer includes a binder resin containing a crosslinked polymer of a photopolymerizable compound and a polysilsesquioxane substituted with one or more reactive functional groups and inorganic fine particles dispersed in the binder resin;
    wherein a ratio of internal haze (Hi) to total haze (Ha) of the antireflection film is 97% or less, and
    a variation in color coordinate value V) of the antireflection film before and after alkali treatment is 0.7 or less.

2. The antireflection film of claim 1, wherein
    the variation in the color coordinate value (b*) of the antireflection film before and after the alkali treatment is determined by measuring the color coordinate values of the antireflection film before and after the alkali treatment in which the antireflection film is immersed for 1 second to 100 seconds in an aqueous alkaline solution diluted to 5 to 50% with distilled water.

3. The antireflection film of claim 1, wherein
    the low reflective index layer has polarization ellipticity measured by an ellipsometry method using a Cauchy model of the following General Formula 1 in which A is 1.20 to 1.65, B is 0 to 0.05, and C is 0 to 0.05:

$$n(\lambda) = A + \frac{B}{\lambda^2} + \frac{C}{\lambda^4} \qquad \text{[General Formula 1]}$$

wherein, in the above General Formula 1, n($\lambda$) is a refractive index at a wavelength $\lambda$, $\lambda$ is in a range of 300 nm to 1800 nm, and A, B, and C are Cauchy parameters.

4. The antireflection film of claim 1, wherein
    the hard coating layer has polarization ellipticity measured by an ellipsometry method using a Cauchy model of the following General Formula 1,
    in which A is 1.30 to 1.75, B is 0 to 0.05, and C is 0 to 0.005:

$$n(\lambda) = A + \frac{B}{\lambda^2} + \frac{C}{\lambda^4} \qquad \text{[General Formula 1]}$$

wherein, in the above General Formula 1, n($\lambda$) is a refractive index at a wavelength $\lambda$, $\lambda$ is in a range of 300 nm to 1800 nm, and A, B, and C are Cauchy parameters.

5. The antireflection film of claim 1, wherein the reflective index layer has a thickness of 1 nm to 200 nm, and the hard coating layer has a thickness of 0.1 μm to 100 μm.

6. The antireflection film of claim 1, wherein a weight ratio of a portion derived from the polysilsesquioxane substituted with one or more reactive functional groups to a portion derived from the photopolymerizable compound in the binder resin contained in the low reflective index layer is 0.005 to 0.50.

7. The antireflection film of claim 1, wherein the functional group substituted on the polysilsesquioxane includes at least one functional group selected from the group consisting of an alcohol, an amine, a carboxylic acid, an epoxide, an imide, a (meth)acrylate, a nitrile, a norbornene, an olefin, polyethylene glycol, a thiol, and a vinyl group.

8. The antireflection film of claim 1, wherein at least one silicon atom of the polysilsesquioxane is substituted with a reactive functional group, and remaining silicon atoms not substituted with the reactive functional groups are substituted with unreactive functional groups.

9. The antireflection film of claim 8, wherein the polysilsesquioxane substituted with one or more reactive functional groups includes a polyhedral oligomeric silsesquioxane having a cage structure, in which one or more functional groups are substituted.

10. The antireflection film of claim 1, wherein the photopolymerizable compound includes a monomer or an oligomer containing a (meth)acrylate or vinyl group.

11. The antireflection film of claim 1, wherein the binder resin further includes a crosslinked polymer of a photopolymerizable compound, a fluorine-based compound containing a photoreactive functional group, and polysilsesquioxane substituted with one or more reactive functional groups.

12. The antireflection film of claim 11, wherein the photoreactive functional group contained in the fluorine-based compound is at least one selected from the group consisting of a (meth)acrylate group, an epoxide group, a vinyl group, and a thiol group.

13. The antireflection film of claim 11, wherein the fluorine-based compound containing photoreactive functional group has a fluorine content of 1% by weight to 60% by weight.

14. The antireflection film of claim 11, wherein the fluorine-based compound containing the photoreactive functional group includes at least one selected from the group consisting of: i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer in which at least one photoreactive functional group is substituted and at least one fluorine is substituted on at least one silicon; and iv) a polyether compound in which at least one photoreactive functional group is substituted and at least one hydrogen is substituted with fluorine.

15. The antireflection film of claim 11, wherein the fluorine-based compound containing the photoreactive functional group has a weight-average molecular weight of 2000 to 200,000.

16. The antireflection film of claim 1, wherein the inorganic fine particles include at least one selected from the group consisting of solid inorganic nanoparticles having a diameter of 0.5 to 100 nm, and hollow inorganic nanoparticles having a diameter of 1 to 200 nm.

17. The antireflection film of claim 1, wherein the hard coating film includes a binder resin containing a photopolymerizable resin and a high molecular weight (co)polymer having a weight average molecular weight of 10,000 or more, and an organic or inorganic fine particle dispersed in the binder resin.

* * * * *